April 6, 1965  G. LEISCHNER  3,177,387
SYNCHRONOUS ELECTRIC FREQUENCY CONVERTER
Filed Aug. 30, 1961  2 Sheets-Sheet 1
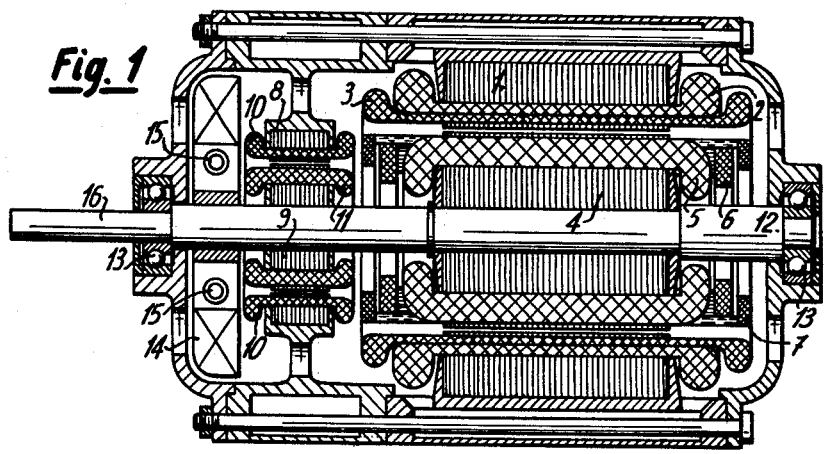
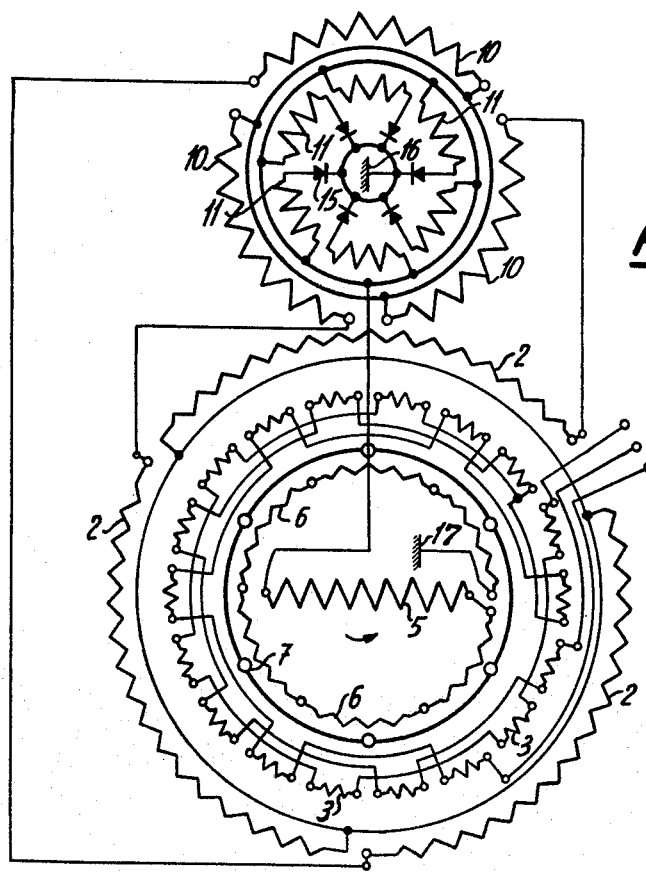
INVENTOR
GEORG LEISCHNER April 6, 1965  G. LEISCHNER  3,177,387
SYNCHRONOUS ELECTRIC FREQUENCY CONVERTER
Filed Aug. 30, 1961  2 Sheets-Sheet 2

INVENTOR
GEORG LEISCHNER
BY Irwin S. Thompson
ATTY.

United States Patent Office 3,177,387
Patented Apr. 6, 1965

3,177,387
SYNCHRONOUS ELECTRIC FREQUENCY CONVERTER
Georg Leischner, Zurich, Switzerland, assignor to Marie Cecile Kissling, Geneva, Switzerland
Filed Aug. 30, 1961, Ser. No. 134,895
Claims priority, application Switzerland, Sept. 9, 1960, 10,202/60
4 Claims.  (Cl. 310—160)

The object of the present invention is to provide an alternating current synchronous machine, which might be preferably used as a generator for an intermediate frequency and having a plurality of phases. Such intermediate frequency machines, the inductor winding of which is energized by means of dry plate rectifiers, must have distinct alternating or multi-phase energizing generators or exciters of low frequency and of the self-energizing type, because in smaller machines the remanent magnetism of the intermediate frequency inductor is very small. As a result, the intermediate frequency inductor is unable to induce a voltage in the generator windings of the intermediate frequency generator winding of the armature. Of course, the intermediate frequency inductor and the intermediate frequency armature each presents the same number of poles, the number of which depends on the value of the associated output intermediate frequency. Therefore, since it is practically not possible to obtain a voltage in said generator winding, it is not possible to realize a self-energizing machine capable of operating at intermediate frequencies. Further, generators having higher frequencies necessitate much greater excitation currents, for the iron losses in the induced magnetic conductor increase quadratically with the frequency. Consequently there are also correspondingly greater excitation losses to overcome. This is the reason why these machines are not able to operate under conditions of self energization at the higher frequencies. This has already been observed with respect to three-phase asynchronous generators with parallel condensers (resonant circuit excitation).

This difficulty becomes still greater, if the inductor is made from sheet iron segments, the remanent magnetism of which is very small, as is well known. Further there is the danger that the remanent magnetism of the inductor will indeed be sufficient to start the self-energizing of the machine, but due to the large amount of excitation power required, such self-energizing always breaks down before the service conditions for the machine can be reached.

These drawbacks are overcome according to the invention by the fact that in order to obtain the self-energizing of the intermediate frequency machine, the remanent magnestim of the inductor body is used to induce a voltage in a low frequency generator winding of the armature which feeds, through rectifiers, a direct current to an excitation winding having a small number of poles, as well as to an intermediate frequency multiphase excitation winding. Both of these excitation windings are carried by the inductor.

With a frequency transformer according to the present invention, the self-energizing power is no longer built up through the polarized remanence of the inductor part presenting the great number of poles i.e. the intermediate frequency inductor part. Instead, self-energizing power is obtained by means of a remanent magnetism which is localized in the iron body of the inductor part which presents the small number of poles, i.e. the low frequency inductor part. Now said inductor part has a corresponding greater flux, because the remanent magnetism increases in the same proportion as the magnetic flux increases in relation with the ratio of the number of poles of the intermediate frequency part which has a great number of poles and the low frequency part which has a small number of poles.

To this effect, there is provided not only the induced stator winding of the part of greater frequency having the first number of poles but also a second induced stator winding having the second number of poles.

The attached drawing illustrates partly schematically a form of execution of the machine according to the invention.

FIG. 1 is a longitudinal cross section of a frequency transformer.

FIG. 2 is a schematic representation of one form of the invention.

Figure 3:
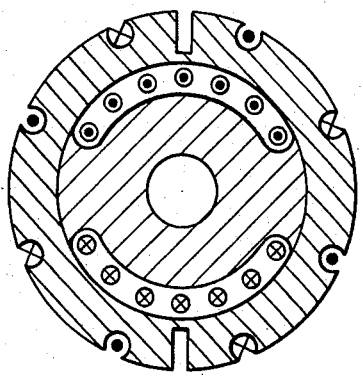
FIG. 3 is a cross section of a rotor having a two pole core and an eight pole wreath, the windings being schematically illustrated.

The frequency transformer according to FIG. 1 is constituted by a stator iron body 1 having, for example, a two pole induced winding 2 and a six pole winding 3.

The rotor body 4 is rigidly fastened on the shaft 12 which rotates in the bearings 13, and the rotor body 4 is provided with a two pole excitation winding 5, a six pole excitation winding 6 and a short circuited squirrel cage 7.

The excitation of the two excitation windings 5 and 6 is performed by means of an energizing machine, the stator body 8 of which is provided with a three-phase winding 10. The energizing machine also has a rotor body 9 which is rigidly fastened onto the shaft 12. Rotor 9 may carry for example a six pole winding 11, which energizes the windings 5 and 6 by means of rectifiers 15. These rectifiers are fastened onto the wings 14 of a fan blower. If the extremity 16 of the shaft 12 is separately driven, then the remanent magnetism in the rotor body 4 will induce a relative weak voltage in the stator winding 2. Said winding 2 is electrically connected according to the circuit of FIG. 2 with the stator winding 10 of the excitation machine. The three-phase voltage induced in the winding 2 through the remanent magnetism, drives a three-phase current through said winding 10 which sets up a rotary field in the stator 8 and the rotor body 9 of the excitation machine. This rotary field produced by winding 10 rotates in the direction opposed to the rotation direction of the shaft 12. If, for example, the rotor 4 and consequently also the rotor 9 rotates in a clockwise direction at a speed of 3000 revolutions per minute, then a 50 c.p.s. three-phase current is induced in the winding 2 by the remanent magnetism, in which current flows through the two pole winding 10 of the excitation machine where it produces a rotary field, which rotates at 50 c.p.s. in a counter-clockwise direction. In the rotor winding 11 of said excitation machine there will consequently be induced a 100 c.p.s. three-phase current, which however flows across the six diodes 15 only in one direction and energizes weakly the rotor excitation windings 5 and 6.

One terminal of each diode 15 and of the excitation winding 6 is grounded by means of connection to the frame of the machine as indicated at 16. Said energizing current flowing through said two pole rotor excitation winding 5 increases the energizing flux and consequently also the voltage induced in the stator winding 2 until the equilibrium state is reached and consequently the nominal voltage of the machine. Simultaneously, together with the rapid increasing with respect to time of the energizing current in the excitation winding 5, said current will be also driven through the six pole winding 6 whereby the other stator winding 3 will be induced at the frequency of 150 c.p.s. corresponding to the number of poles of said winding.

Machines according to the present invention are however not limited to only two winding systems having different numbers of poles, but may practically be made with any number of poles and with a multiple number of driving systems.

Besides the technical progress represented by the self excitation without requiring any sliding contact rings or brushes, there is the further advantage that the voltage in the low frequency winding 2 does not decrease in the case of load shocks or of short circuits in the high frequency winding 3, but remains absolutely constant. Consequently this machine will never lose the remanence of the main flux i.e. said main flux may never be nullified.

In a frequency converter according to FIG. 1, made for example according to the circuit of FIG. 2, all the coils of each of two rotor windings 5 and 6 which are respectively the low frequency and the intermediate frequency exciting windings, are connected in series. Said windings 5 and 6 could however also work in shunt connection, whereby one terminal of each winding is connected to ground 17 and the other terminals are, on the contrary, both connected to the neutral point of the six arms of the winding 11 of the rotor 9 of the energizing machine.

Further the stator 8 of the excitation machine could be provided with at least two stator windings 10 having different number of poles, whereby said winding induces in the stator iron as well as in the rotor iron 9 two superimposed rotary fluxes. In the rotor 9 will then also be inserted two induced windings 11 of different number of poles, whereby said rotor winding must be congruent with the stator windings. Each of said two rotor windings 11 energizes then separately, across several diodes 15, each one of the two—in this case electrically separated—excitation windings 5 and 6 of the generator. The primary excitation current is fed to the two stator windings 10 also through the generator stator winding 2 of the stator 1. By this arrangement the two excitation currents in the inductor windings 5 and 6 may be independently regulated, so that said regulation is also transmitted on the two stator windings 2 and 3. It is also possible that for example only the inductor excitation winding 5 (having two poles) may be connected across the stator excitation winding 10, or the rotor excitation winding 11 and the diodes 15 may be fed from the generator stator winding. The inductor excitation winding 6 having a greater number of poles is then connected across the other excitation windings and the diodes with the generator stator winding 3 foreseen for a greater frequency. Said connection may also be made in series as compound regulation in relation to the load current in the winding 3 which acts on the inductor excitation winding 6. Here one obtains that the base or main flux of the two inductor excitation windings 5 and 6 built up by the self excitation will be increased in relation to the increasing of the load current in the induced stator winding of greater frequency, the energizing current for example into the excitation winding 6, in such a manner that in the winding 3 the voltage remains constant from the idle running until the full load.

Said voltage compensation may also be obtained by an increase of the base excitation in the inductor excitation winding 5 which acts on the induced voltage in the winding 2. It is of no importance which load current is used for the compensation of the voltage in the part of lower or higher frequency of the generator.

In place of the excitation machine having the stator winding 10 and the rotor winding 11, as well as diodes 15, said combination may also be replaced by a transformer having fixed primary and secondary windings. In this case, however, contact rings and brushes are necessary on the inductor, in order to feed the excitation current to the two rotor excitation windings 5 and 6.

In order to produce self-excitation of the described frequency converter, there is used only the remanence in that part of the inductor 4 which constitutes the magnetic flux conductor having the smallest number of poles.

As the source of the remanence is in the rotor body or core 4, it is advantageous to manufacture rotor 4 from a material having high coercive force i.e. of a ferro magnetic substance having a large hysteresis loop. The core 4 may also be made of a solid ferro magnetic material; the inductor wreath having the excitation winding presenting the great number of poles may, on the contrary, be manufactured in sheet iron. The core 4 may present the shape of a drum or of a star.

Figure 4:
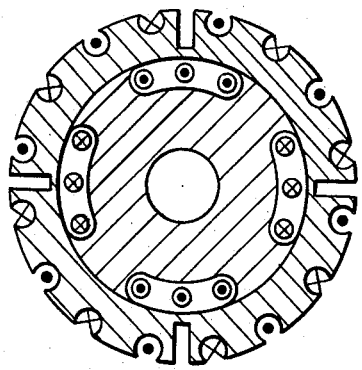
FIG. 4 is a cross section of a rotor having a four pole core and a sixteen pole wreath, the windings being schematically illustrated.
Figure 5:
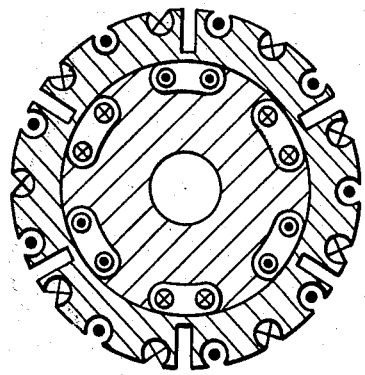
FIG. 5 is a cross section of a rotor having a six pole core and an eighteen pole wreath, with a schematic representation of the windings, the direction of the excitation current being indicated diagrammatically.

FIGS. 3 to 5 show schematically such a star shaped rotor core 4.

An efficient means for the prevention of the demagnetization i.e. of the withdrawal in the lower frequency rotary magnetic flux system of the remanence of the rotor star consists in that the magnetic induction of the rotary flux of lower frequency is greater than the induction of the superimposed rotary flux of higher frequency. For example in a machine having operating frequencies of 50 and 400 c.p.s., and having rotary fields presenting two poles and six poles, the rotary field having two poles must be arranged to take over the basic magnetization presenting the greater induction. Correspondingly, the induction of the rotary field presenting sixteen poles should be weaker than the aforesaid two pole field.

With this arrangement the formerly relative high iron losses in the flux conductor system having sixteen poles are reduced in a great measure. This effect has already been observed on the first test machines and stand by machines according to the present invention in complete opposition with the standard machines, for example the frequency transformers which show high iron losses in the rotor iron induced by the higher frequency. In generators for two frequencies according to the present invention this new effect has been also observed.

I claim:

1. A synchronous electric machine, and particularly a frequency converter to convert line frequency to an intermediate frequency, said converter comprising a rotor body and a stator body, a low frequency multi-phase inductor excitation winding and a low frequency multi-phase generator winding, one of said low frequency windings being carried by said rotor body and the other one by said stator body, an intermediate frequency multi-phase excitation winding and an intermediate frequency multi-phase generator winding, one of said intermediate frequency multi-phase windings being carried by said rotor body and the other one by said stator body, and rectifier means connected to said low frequency multi-phase generator winding for feeding direct current to both said low frequency excitation winding and said intermediate frequency excitation winding, the remanent magnetism of the body which carries said excitation windings producing a self-energizing current in said low frequency generator winding, said self-energizing current being converted to direct current by said rectifier means and fed to both excitation windings.

2. An electric machine as claimed in claim 1, in which the body which carries said excitation windings is made of a ferro magnetic substance having a large hysteresis loop in order to increase its coercive force.

3. An electric machine as claimed in claim 1, in which the rotor body forms the source of the remanent magnetism and comprises a star shaped support of the rotor wreath made of sheet iron, said support being provided with winding slots.

4. An electric machine as claimed in claim 3 in which in the inner of said rotor inductor wreath of sheet iron provided with the excitation winding located in winding slots or apertures made in the poles, there is the core shaped rotor star around the arms of which the low frequency multi-phase inductor excitation winding is wound.

References Cited by the Examiner
UNITED STATES PATENTS
2,722,652  11/55  Brainard _____ 310—68.4

MILTON O. HIRSHFIELD, *Primary Examiner.*
ORIS L. RADER, *Examiner.*